INVENTORS.
JEREMIAH W. O'BRIEN
JOHN T. O'KEEFE
BY
ATTORNEY.

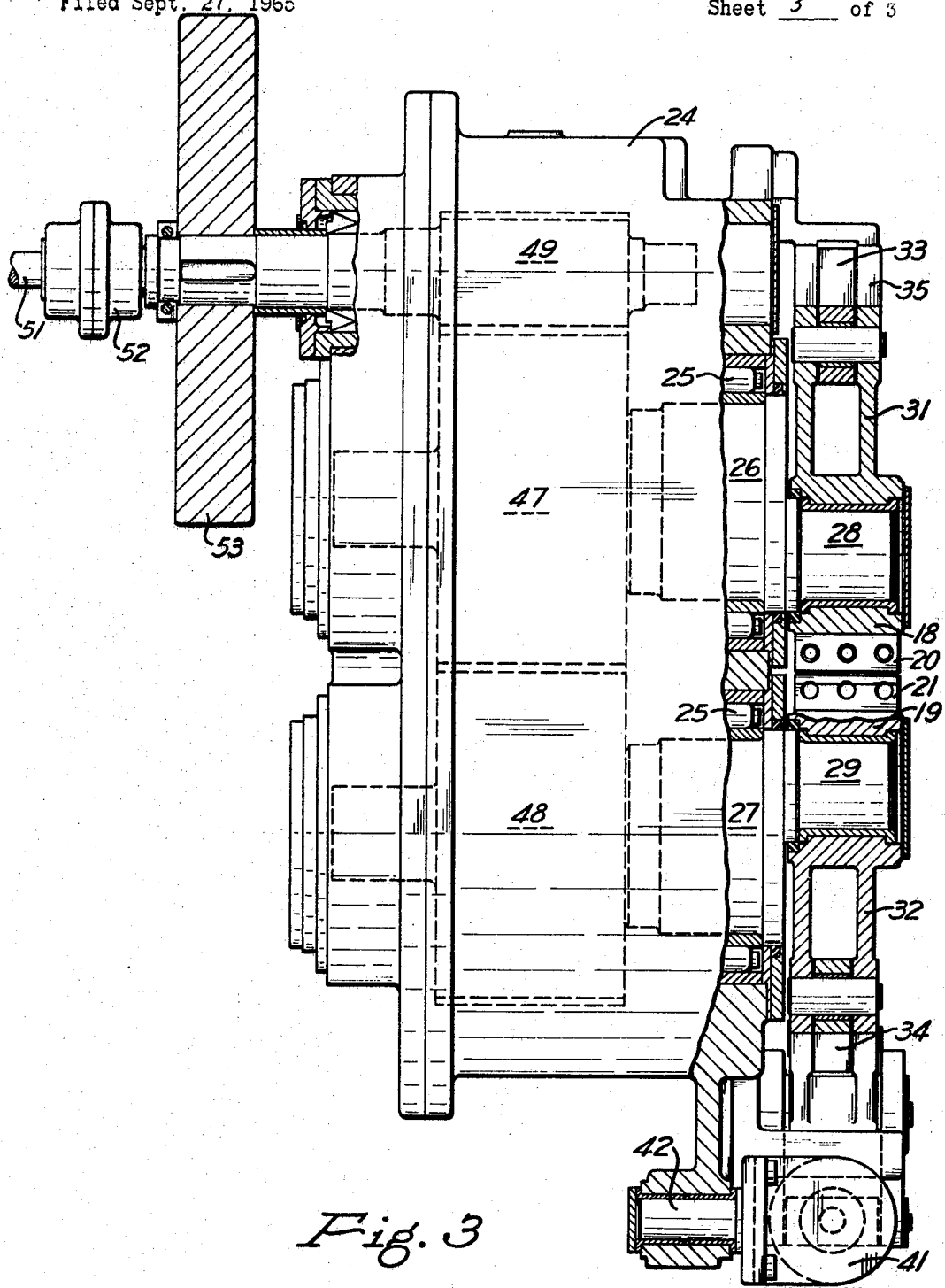

United States Patent Office 3,420,084
Patented Jan. 7, 1969

3,420,084
MISCUT MECHANISM FOR SHEARS
Jeremiah Wagner O'Brien and John Thomas O'Keefe,
Pittsburgh, Pa., assignors to United Engineering and
Foundry Company, Pittsburgh, Pa., a corporation of
Pennsylvania
Filed Sept. 27, 1965, Ser. No. 490,513
Claims priority, application Great Britain, Oct. 12, 1964,
41,645/64
U.S. Cl. 72—203                4 Claims
Int. Cl. B21b 15/00

ABSTRACT OF THE DISCLOSURE

The present disclosure relates to a scrap chopper shear employed in conjunction with a side trimming shear for trimming the marginal edges from moving rolled metallic strip. The scraper chopper shear, employed to shear up the scrap marginal edges, includes an upper and lower knifehead to which there are secured cropping knives. The knives are adapted to effect a cut of the strip fed therebetween upon the rotation of at least one of the knifeheads. The rotatable knifehead is provided with an arm that controls its position so as to bring the knife into the cutting position upon each rotation of the head. An extendible arm is connected to the other knifehead which is constructed to have two positions. In one position the position of the knifehead is constructed so as to place the knife in a cutting position. In the second position the knife is displaced out of the cutting position to avoid the scrap chopping operation. Means are provided for extending and retracting the extendible arm.

---

Figure 1:
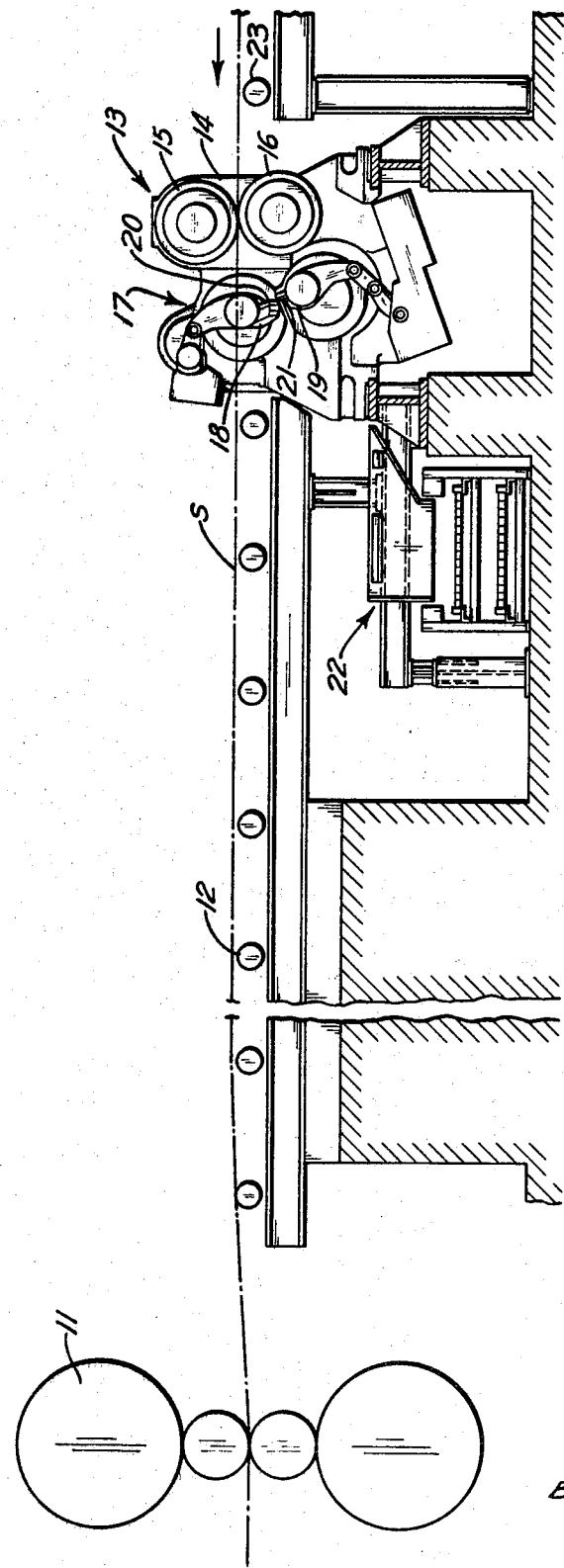

The present invention relates to a shearing apparatus for metallic workpieces, such as strip.

While the invention has immediate application to a number of different fields in the production of elongated workpieces, for the purpose of describing it reference will be made to the side trimming of metallic strip incident to its being rolled in a rolling mill. In the production of certain metallic strip, such as aluminum, it is highly desirable to arrange a side trimming shear to precede the finishing train of a hot strip mill. This shear is employed to remove the opposite marginal edges from the strip prior to the strip entering into the first stand of the finishing train. The shear is usually driven at a speed approximately equal to the speed of the first stand of the finishing train and delivers the marginal edges to a scrap chopping shear where the marginal edges are sheared into predetermined lengths so that they can be conveniently handled. The scrap chopper, as it is sometimes called, is driven at a speed synchronous with the speed of the side trimming shear.

In the operation of such a mill, for any number of reasons, the strip passing from the side trimming shear to the first stand of the mill occasionally hesitates and, as a result, does not enter into the bite of the mill rolls. When this ocurs, the strip has the tendency to form a loop between the mill stand and the side trimming shear. This condition necessitates a reversal of the direction of rotation of the knives of the side trimming shear to retract the strip away from the bite of the mill rolls, after which the rotation of the side trimming shear knives is again reversed to cause the leading end of the strip to pass into the mill stand.

The slowing down, stoppage and reversal of the knives of the side trimming shears to effect a re-entrance of the strip into the mill impose serious forces upon the scrap choppers. This may be appreciated in considering that at the moment the knives of the side trimming shears are caused to reverse their direction of rotation so that the strip may be re-entered into the stand, the trimmed marginal edges of the strip at this instance are protruding through the bite areas of the scrap choppers so that the knives of the scrap choppers attempt to cut off the marginal edges while the side trimming shears are attempting to retract the marginal edges from the scrap choppers. It is important to note that the scrap chopper knives during this period are moving in a direction opposite to the movement of the marginal edges. As a result, when cuts are performed, the scrap chopper knives actually pull the edges between the side trimming shears and must overcome the influence of the side trimming shears to effect a cut.

According to the present invention, there is provided in combination with a scrap chopper a miscut mechanism for preventing the scrap chopper from effecting a cut during the period when the side trimming shear is operated in a reversed direction. Stated another way, the cutting elements of at least one of the scrap choppers is positioned so as not to engage and perform a cut upon the side trimmed marginal portions.

In one form of the present invention there is provided in combination with a rolling mill and at a location preceding the mill a side trimming shear for severing the opposite marginal edges from a strip passing to the mill. At the delivery side of the side trimming shear and arranged to receive the trimmed marginal edges, there are provided scrap choppers designed to sever the marginal edges into predetermined lengths. Means are provided for driving independently the side trimming shear and the scrap choppers and at a speed approximately equal to that of the mill, which arrangement also includes means for reversing the direction of rotation of the side trimming shear. Further, means are provided for selectively displacing at least one of the knives of each of the scrap choppers so as to cause it to assume an inoperative position; whereby in the operative position, the marginal edges will be sheared and in the inoperative position, no shearing will take place.

With respect to the miscut mechanism provided for the scrap chopper, this invention provides upper and lower shafts for carrying individual knifeheads which include cooperative knives adapted to be brought to a cutting position upon rotation of the shafts, means for driving said shafts in opposite directions, means connected to said knifeheads to control the position of the knives and bring them into cutting position carried by that knifehead, means associated with one of said last-mentioned means for displacing the knifehead with which it is associated out of its operative cutting position so that the knives will not effect a cut.

Figure 2:
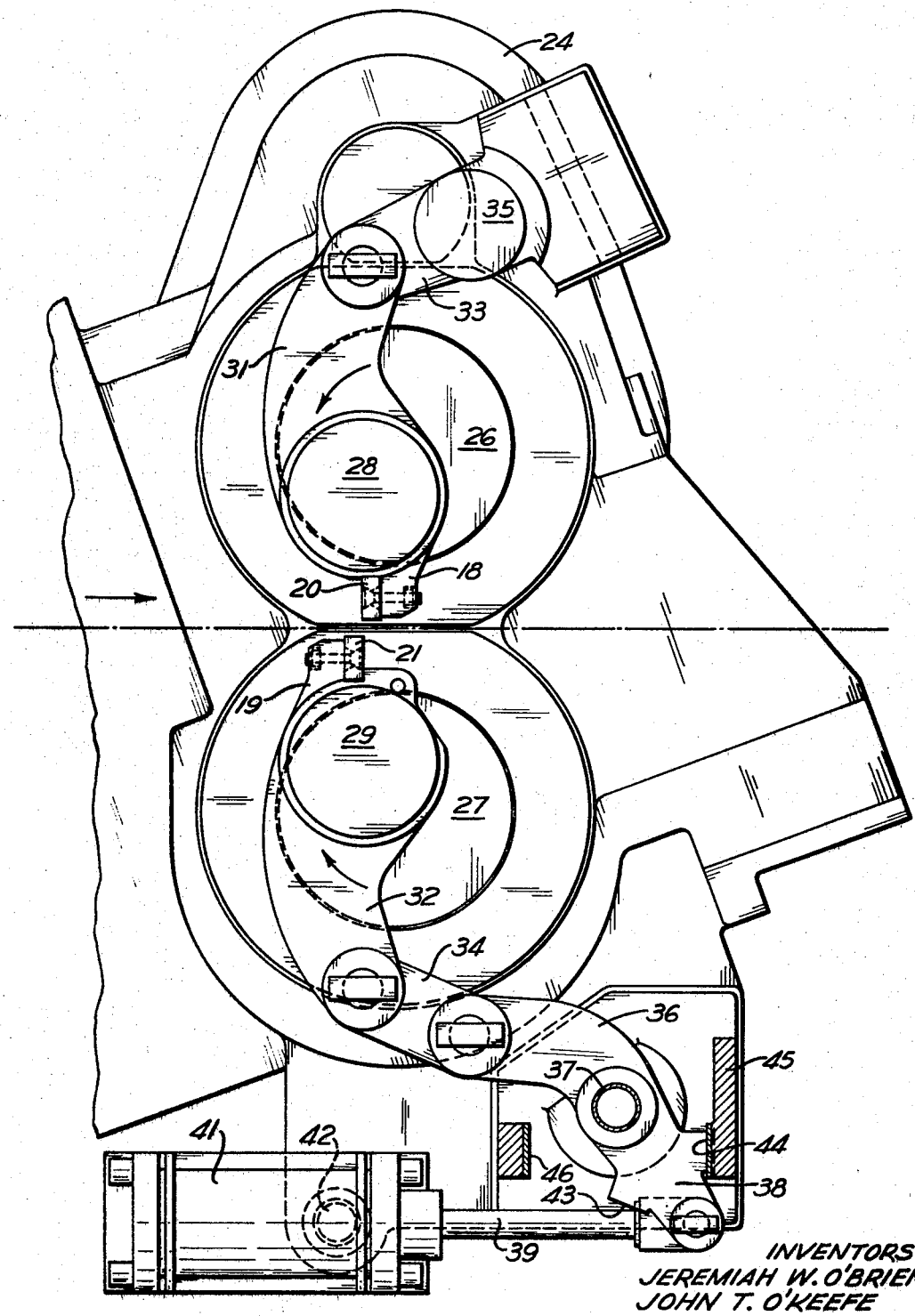

These objects, as well as others, will be better understood when the following specification is read along with the accompanying drawings of which:

FIGURE 1 is an elevational view, partly in section, illustrating schematically from left to right the first stand of a finishing train of a hot strip mill, a mill run-in table, a combined scrap chopper and side trimming shear, FIGURE 2 is an enlarged elevational view of the scrap chopper shear and miscut mechanism illustrated in FIGURE 1, and FIGURE 3 is an elevational view, partly in section, of the scrap chopper shear shown in FIGURE 2.

With reference to FIGURE 1 and, in reading from left to right, there is schematically illustrated the first stand 11 of a tandem finishing mill of the type employed for producing aluminum strip. On the entry side of the mill 11 there is a strip roller table 12 which is preceded by a side trimming shear 13. The side trimming shear, as is true of the other components heretofore mentioned, is of customary design consisting of a housing 14 for rotatably carrying two pairs of cooperative disk-type shear blades 15 and 16, one pair only being shown; one pair for shearing one marginal edge of a strip S, and the opposed pair for shearing the other marginal edge of the strip. For each side trimming shear there are provided identical scrap choppers, one of which is only shown at the delivery side of the side trimming shear 13 and at a lower elevation. The scrap chopper 17 has a pair of rotating knifeheads 18 and 19 to which are secured cooperative cutting knives 20 and 21 for severing the marginal edges of strip received from the side trimmer 13. Below the scrap chopper and directly under the table 12 there is a scrap chute and conveyor assembly 22 which handles the scrap pieces produced by the scrap chopper shear 17. The strip is brought to the side trimming shear 13 by an entry table 23 in the direction shown by the arrow at the extreme right side of FIGURE 1. It should be mentioned that the side trimming shear knives 15 and 16 are driven from a drive independent of the knives 20 and 21 of the scrap chopper at a speed approximately equal to the speed of the stand 11 at which speed the scrap chopper is also driven.

With reference now, particularly to the scrap chopper shear 17, which is best illustrated in the enlarged views of FIGURES 2 and 3, the shear consists of a housing 24 including bearings 25 for rotatably carrying shafts 26 and 27, each having crank portions 28 and 29 protruding from the housings 24 in an overhanging relationship. The cranks 28 and 29 form part of the rotatable knifeheads 18 and 19 previously identified to which at their lower and upper portions, respectively, there are secured the knives 20 and 21. The heads 18 and 19 also include upper and lower arms 31 and 32 which are pivotally connected to links 33 and 34, respectively. The link 33 located at the top of the shear, as best shown in FIGURE 3, is pivotally connected to the housing 24 by a pin 35. At the bottom of the shear the link 34 forms a part of an extendible or collapsible linkage arrangement and is connected to a second link 36 which is carried by a pin 37. The link 34 has a downwardly projecting portion 38 which is connected to a piston 39 of a piston cylinder assembly 41. The assembly 41 is connected to a trunnion 42 which is connected to the housing 24. Referring again to the portion 38 of the link 34, it will be observed that there is provided two opposed flat surfaces 43 and 44 which engage stops 45 and 46, also carried by the housing 24. The stops define the operative and inoperative position of the lower knifehead 19. By the terms operative and inoperative position are meant the cutting and miscutting position of the lower knifehead.

With reference now to FIGURE 3 it can be seen that the cranks 28 and 29 of the shafts 26 and 27 are each driven by identical gears 47 and 48, respectively; the upper gear 47 being driven by a motor pinion 49 which is connected to a motor not shown by a shaft 51 and a coupling 52. The particular drive arrangement illustrated includes a flywheel 53 mounted between the coupling 52 and the back of the housing 24.

In now briefly describing the operation of the arrangement of the equipment illustrated in FIGURE 1, let it be assumed that the strip S has issued through the side trimming shear 13 where its opposite marginal edges will be severed and the severed marginal edges fed between the rotating knives 20 and 21 of the scrap chopper shear 17. The trimmed strip will then pass on to the stand 11. Let it further be assumed that according to the experience of present-day practice that the leading end of the strip S fails to enter the stand 11. This, as previously noted, will tend to form a loop between the stand 11 and the side trimming shear 13 in view of the fact that the shear 13 is rotating at approximately the same speed as the stand 11. When a loop occurs, it is necessary to reverse the direction of rotation of the knives 15 and 16 of the side trimming shear 13 so that the leading end of the strip can be re-entered into the stand 11. Upon the reversal of the side trimming shear 13, the piston cylinder assembly 41 is operated, either automatically or manually, to displace the lower knifehead 19 of the scrap chopper 17 so that as it rotates the knife 21 carried thereby will not come into a cutting relationship with the upper knife 20 while both knifeheads 18 and 19 continue to rotate. The displacement of the lower knives 21 will avoid the serious problem faced by prior designs in that withdrawal of the trimmed marginal edges from the bite area of the scrap choppers creates objectional shock forces on the equipment due to the action of the scrap chopper rotating in one direction and the side trimming shear pulling strip in the other.

In summary, the present invention, while particularly advantageous in connection with the arrangement calling for a side trimming shear to be arranged in front of a mill, also presents a miscut mechanism for a scrap chopper which has utility in scrap choppers employed for other purposes than in the invironment illustrated.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In combination with a rolling mill and a side trimming shear adapted to trim a marginal edge of strip before it enters the mill, a scrap chopper shear having a pair of knives and arranged at the delivery side of the side trimming shear adapted to cut the trimmed marginal edge after it issues from the side trimming shear, means for individually driving the side trimming shear and the scrap chopper shear at a speed approximately equal to the speed of the mill, and wherein said side trimming shear is reversibly driven to withdraw the strip from the mill, means for selectively displacing one of the knives of the scrap chopper shear to render the scrap chopper shear inoperative while it is still being driven, thereby upon reverse operation of the side trimming shear to withdraw the strip from the mill, the strip will not be subject to scrap chopping.

2. In a side chopper shear according to claim 1 wherein said drive means comprise eccentrics, said knifeheads rotatably carried by said eccentrics, said eccentrics being rotated in opposite directions by intermeshing gears, a fixed length link connected to one of said knifeheads being so constructed and arranged to cause a knife thereof to assume a cutting position at each rotation of said eccentrics, collapsible linkage connected to said other knifehead which, when uncollapsed, causes the knife thereof to assume a cutting position on rotation of said eccentrics and when collapsed, causes the knife to miss a cutting operation, a shaft for supporting said collapsible linkage, and a force exerting means for displacing said collapsible linkage into one of its two positions.

3. In a scrap chopping shear according to claim 2 wherein said collapsible linkage includes an extension, and said force exerting means comprising a piston cylinder assembly and, wherein means are included for engaging the extension of said collapsible linkage on two opposite sides, one defining the collapsed position and the other the uncollapsed position of said collapsible linkage.

4. In a scrap chopping shear having a housing, upper and lower knifeheads suported by said housing, a knife carried by each knifehead, drive means for causing displacement of at least one knifehead and one knife, means carried by said housing associated with said one knifehead to control its position so as to bring its knife into a cutting position with respect to the other knife upon displacement of said one head, extendible means carried by said housing associated with said other knife and constructed and arranged to have a first position which maintains said other knife in a cutting position and a second position which maintains said other knife out of the cutting position, and means connected to said extendible means for selectively moving said extendible means into said two positions.

References Cited

UNITED STATES PATENTS

| | | | |
|---|---|---|---|
| 2,203,738 | 6/1940 | Nash | 83—302 |
| 2,397,603 | 4/1946 | Hackett | 83—923 |
| 3,110,208 | 11/1963 | Mitchell et al. | 83—923 |
| 3,121,361 | 2/1964 | Kramer | 83—564 |
| 3,246,553 | 4/1966 | O'Brien | 83—302 |

FOREIGN PATENTS 758,281   10/1956   Great Britain.

CHARLES W. LANHAM, *Primary Examiner.*

A. RUDERMAN, *Assistant Examiner.*

U.S. Cl. X.R.

83—302, 564, 923